US010990906B2

(12) United States Patent
Bodell et al.

(10) Patent No.: US 10,990,906 B2
(45) Date of Patent: Apr. 27, 2021

(54) METHOD AND APPARATUS FOR RESERVING ZERO-WAIT TIME AGENT INTERACTIONS

(71) Applicant: [24]7.AI, INC., San Jose, CA (US)

(72) Inventors: Michael Bodell, Santa Clara, CA (US); Vijay Kumar Jandhyala, Bangalore (IN); Yellu Madhusudhan Reddy, Bangalore (IN)

(73) Assignee: [24]7.ai, Inc., San Jose, CA (US)

( * ) Notice: Subject to any disclaimer, the term of this patent is extended or adjusted under 35 U.S.C. 154(b) by 453 days.

(21) Appl. No.: 15/289,911

(22) Filed: Oct. 10, 2016

(65) Prior Publication Data

US 2017/0103346 A1  Apr. 13, 2017

Related U.S. Application Data

(60) Provisional application No. 62/240,786, filed on Oct. 13, 2015.

(51) Int. Cl.
*G06Q 10/02* (2012.01)
*G06Q 10/06* (2012.01)
*G06Q 30/00* (2012.01)

(52) U.S. Cl.
CPC ..... *G06Q 10/02* (2013.01); *G06Q 10/063114* (2013.01); *G06Q 30/016* (2013.01)

(58) Field of Classification Search
CPC .......... G06Q 10/02; G06Q 10/063114; G06Q 30/016
USPC .............................................. 705/5
See application file for complete search history.

(56) References Cited

U.S. PATENT DOCUMENTS

| 6,088,441 A * | 7/2000 | Flockhart ............ H04M 3/5233 379/265.12 |
| 6,714,643 B1 * | 3/2004 | Gargeya ................ H04M 3/523 379/265.02 |
| 6,973,176 B1 * | 12/2005 | Chism ................. H04M 3/5233 379/265.12 |

(Continued)

OTHER PUBLICATIONS

Legros, Benjamin, et. al.; "A flexible architecture for call centers with skill-based routing"; Sep. 22, 2014 (Year: 2014).*

*Primary Examiner* — George Chen
*Assistant Examiner* — Dione N. Simpson
(74) *Attorney, Agent, or Firm* — Perkins Coie LLP; Michael Glenn

(57) ABSTRACT

A computer-implemented method and an apparatus reserve agents for enabling zero-waiting time agent interactions for customers requiring agent assistance. The method includes determining if a customer requires agent assistance. If it is determined that the customer requires agent assistance, then it is determined whether an agent associated with relevant skill is capable of being reserved for providing assistance to the customer. The determination of reservation of the agent is performed, at least in part, by generating a data structure representation. The agent is reserved for assisting the customer if it is determined that the agent is capable of being reserved for providing assistance to the customer. An offer for assistance is provisioned to the customer on at least one enterprise related interaction channel subsequent to the reservation of the agent. The reservation of the agent provides wait-less customer interaction with the agent upon customer acceptance of the offer.

32 Claims, 6 Drawing Sheets

(56) References Cited

U.S. PATENT DOCUMENTS

| | | | |
|---|---|---|---|
| 7,406,515 B1* | 7/2008 | Joyce | H04M 3/5175 379/265.01 |
| 2002/0159475 A1* | 10/2002 | Hung | H04M 3/5191 370/465 |
| 2004/0083195 A1* | 4/2004 | McCord | H04M 3/5233 706/47 |
| 2007/0230681 A1 | 10/2007 | Boyer et al. | |
| 2014/0079208 A1 | 3/2014 | Ervin et al. | |
| 2014/0358612 A1 | 12/2014 | Sri et al. | |
| 2015/0003604 A1 | 1/2015 | McCormack et al. | |
| 2018/0159981 A1* | 6/2018 | Anisimov | H04M 3/5232 |

* cited by examiner

METHOD AND APPARATUS FOR RESERVING ZERO-WAIT TIME AGENT INTERACTIONS

CROSS REFERENCE TO RELATED APPLICATIONS

This application claims priority to U.S. provisional patent application Ser. No. 62/240,786, filed Oct. 13, 2015, which is incorporated herein in its entirety by this reference thereto.

TECHNICAL FIELD

The present technology generally relates to interactions between customers and customer support representatives or agents of an enterprise, and more specifically to a method and apparatus for reserving zero-wait time agent interactions for improving customer interaction experiences.

BACKGROUND

Enterprises and their customers interact with each other for a variety of purposes. For example, enterprises may engage with existing customers and potential customers to draw the customer's attention towards a product or a service, to provide information about an event of customer interest, to offer incentives and discounts, to solicit feedback, to provide billing related information, and the like. Similarly, the customers may initiate interactions with the enterprises to enquire about products/services of interest, to resolve concerns, to make payments, to lodge complaints, and the like.

Typically, the interactions between enterprises and their customers involve one or more interaction channels. Some examples of an interaction channel may include a Web channel, a voice channel, a chat channel, an interactive voice response (IVR) channel, a social media channel, a native mobile application channel, and the like.

In many example scenarios, customers may require assistance during an on-going interaction. For example, a customer may be engaged in a voice conversation with an IVR system and may desire to speak with a live agent. In another example scenario, a customer may require assistance in locating desired information when browsing an enterprise website. In such a scenario, the customer may proactively be offered assistance in form of a voice/chat conversation with an agent (for example, a live agent or a virtual agent). If the customer accepts the offer for assistance, then the voice/chat conversation should be initiated without any waiting time for the customer. To provide such assistance to the customer, an availability of the agent has to be ensured prior to offering assistance to the customer or the customer might have to wait for the agent to be available for continuing the interaction. Waiting for the interaction to continue can be very frustrating for the customer and can lead to the customer abandoning the interaction.

SUMMARY

In an embodiment of the invention, a computer-implemented method for reserving agents for enabling zero-wait agent interactions is disclosed. The method receives, by a processor, information corresponding to customer activity on at least one enterprise related interaction channel. The method determines, by the processor, if a customer associated with the customer activity requires agent assistance based on the received information. If it is determined that the customer requires agent assistance, the method determines, by the processor, whether an agent from among a plurality of agents is capable of being reserved for providing assistance to the customer. The agent is associated with at least one relevant skill for providing assistance to the customer. The determination of reservation of the agent is performed, at least in part, by generating a data structure representation configured to facilitate tracking an availability of the at least one relevant skill from among a plurality of skills associated with the plurality of agents. The method reserves, by the processor, the agent for assisting the customer if it is determined that the agent is capable of being reserved for providing assistance to the customer. The method provisions, by the processor, an offer for assistance to the customer on the at least one enterprise related interaction channel subsequent to the reservation of the agent. The reservation of the agent provides wait-less customer interaction with the agent upon customer acceptance of the offer.

In another embodiment of the invention, an apparatus for reserving agents for enabling zero-wait agent interactions includes at least one processor and a memory. The memory stores machine executable instructions therein, that when executed by the at least one processor, causes the apparatus to receive information corresponding to customer activity on at least one enterprise related interaction channel. The apparatus determines if a customer associated with the customer activity requires agent assistance based on the received information. If it is determined that the customer requires agent assistance, the apparatus determines whether an agent from among a plurality of agents is capable of being reserved for providing assistance to the customer. The agent is associated with at least one relevant skill for providing assistance to the customer. The determination of reservation of the agent is performed, at least in part, by generating a data structure representation configured to facilitate tracking an availability of the at least one relevant skill from among a plurality of skills associated with the plurality of agents. The apparatus reserves the agent for assisting the customer if it is determined that the agent is capable of being reserved for providing assistance to the customer. The apparatus provisions an offer for assistance to the customer on the enterprise related interaction channel subsequent to the reservation of the agent. The reservation of the agent provides wait-less customer interaction with the agent upon customer acceptance of the offer.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Figure 1:
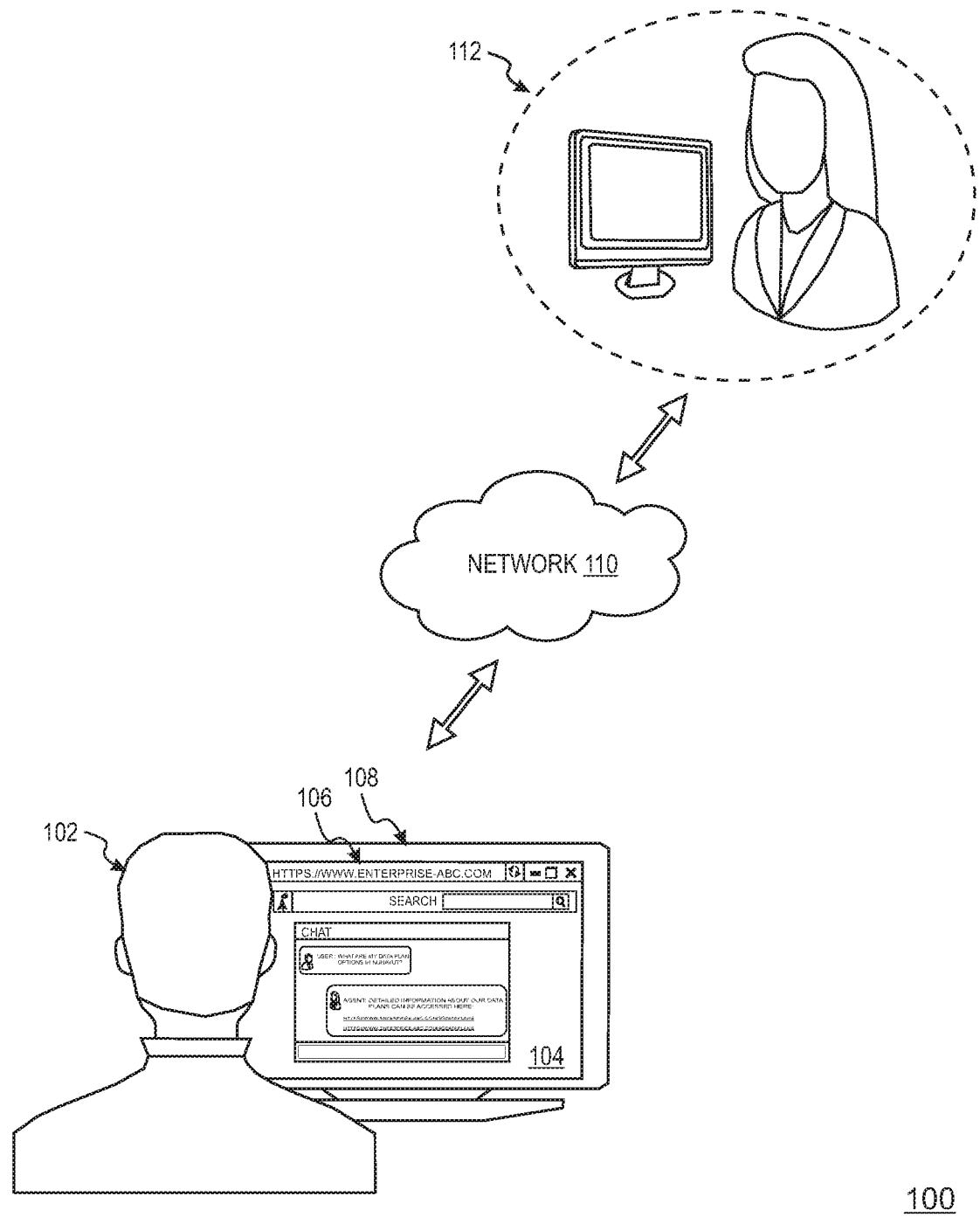
FIG. 1 is an example representation showing a customer engaged in an interaction with an enterprise, in accordance with an example scenario.

FIG. 1 is an example representation 100 showing a customer engaged in an interaction with an enterprise, in accordance with an example scenario. More specifically, FIG. 1 shows a customer 102 accessing a website 104 of the enterprise using a Web browser application 106 installed on a desktop computer 108. The website 104 is configured to display content, such as for example, products, services and/or information offered for sale by the enterprise. In an example scenario, the website 104 may be hosted on a remote Web server and the Web browser application 106 may be configured to retrieve one or more Web pages associated with the website 104 over a network 110. Some examples of the network 110 may include wired networks, wireless networks, or a combination thereof. Some examples of wired networks may include Ethernet, local area network (LAN), fiber-optic cable network, and the like. Some examples of wireless networks may include cellular networks like GSM/3G/4G/CDMA networks, wireless LAN, blue-tooth or Zigbee networks, and the like. An example of a combination of wired and wireless networks may include the Internet. It is understood that the website 104 may attract a large number of existing and potential customers, such as the customer 102.

In an example scenario, the customer 102 may access the website 104, i.e. use the Web channel, to learn about new products being offered for sale by the enterprise. It is understood that the customer 102 may use other interaction channels to learn about new products being offered for sale by the enterprise. For example, the customer 102 may access a native mobile application, i.e. use a native device channel, on another device, such as for example a cellular phone, to learn about the new products being offered for sale by the enterprise. Alternatively, the customer 102 may learn about new products being offered for sale by the enterprise using an IVR channel. In an example scenario, a customer intention to learn about new products being offered for sale may be predicted based on customer actions on the website 104, such as for example, a sequence of Web page visits, time spent on individual Web pages of the website 104, and the like. The customer 102 may proactively be offered assistance in form of a chat conversation with an agent, such as the agent 112. If the customer 102 accepts the offer for assistance, then the chat conversation should be initiated without any waiting time for the customer 102. To provide such assistance to the customer 102, an availability of the agent 112 has to be ensured prior to offering assistance to the customer 102 or the customer 102 might have to wait for the agent 112 to be available for continuing the interaction. Accordingly, agents may need to be reserved before offering assistance to the customers to ensure availability when required.

However, reserving agents for ensuring availability may involve several challenges. For example, the agents may change state between an interaction state and a free state. Further, the agents have different skills, i.e. areas of expertise, for example, expertise in dealing with complaints, in handling technical queries, etc., and different skills would be needed for each particular interaction or reservation. For example, consider a scenario involving two agents A and B with agent A having skills 'a' and 'c' and agent B having skills 'b' and 'c'. If a reservation is to be made that requires skill 'c', then agent A may be reserved. However, if another request for reservation comes in for skill 'a' then this request may be assigned to A and first reservation may be moved to B because B has the 'c' skill. Reservation in a scenario involving two agents with two skills each is fairly simple. However, if there are hundreds of agents and dozens of possible skills, then determining if a reservation can be given or not, and then keeping the state to succeed may be a challenge. Further, constraints, such as not changing an agent allocation once an agent interaction has started with a customer, may also have to be taken in to consideration.

Solving the above problem may involve checking whether any possible agent can be assigned to a reservation or not. In one example scenario, agents may be ordered in every possible order and reservations may be matched to this order. Such a solution has computational complexity of ~n factorial (n!), where n represents a number of agents. The computation becomes increasingly impractical with increase in the number of agents, for example, for if n=3, 3!=6; for n=9, 9!=362880; for n=18, 18!=6.4×10^15 and so on and so forth. It may be impractical to implement such a solution for 50 agents or 100 agents because the complexity increases manifold.

In another example scenario, every agent may be considered as either 'in' or 'not in' the reserve group with a complexity of $2^n$ algorithm, for example if n=3, $2^3$=8; if n=9, $2^9$=512; if n=18, $2^{18}$=262,144; if n=50, $2^{50}$=1.1× $10^{15}$ and so on and so forth. In such a scenario, the algorithm grows too complex to be used and moreover, the underlying assumption herein is that the agents are associated with only one skill. However, if the agents are associated with m-skills, then each agent in one of m+1 states (free, skill 1, skill 2 . . . skill m) must be considered and then for n agents and m skills a check of $(m+1)^n$ may be even more cumbersome.

As suggested above, agents may need to be reserved before offering assistance to the customer to ensure availability when required. Waiting for the interaction to continue can be very frustrating for the customer and can lead to the customer abandoning the interaction, perhaps never to return. Therefore, there is a need to facilitate customer interactions with agents while ensuring there is no waiting time (or zero waiting time) for the customers to preclude frustrating interaction experiences for the customers and operating losses for the enterprises.

Various embodiments of the present technology provide a method and apparatus to optimally reserve agents and ensure wait-less or zero-waiting time interactions with multi-skill agents. An apparatus for reserving agents for enabling wait-less or zero-waiting time agent interactions is explained with reference to FIG. 2.

Figure 2:
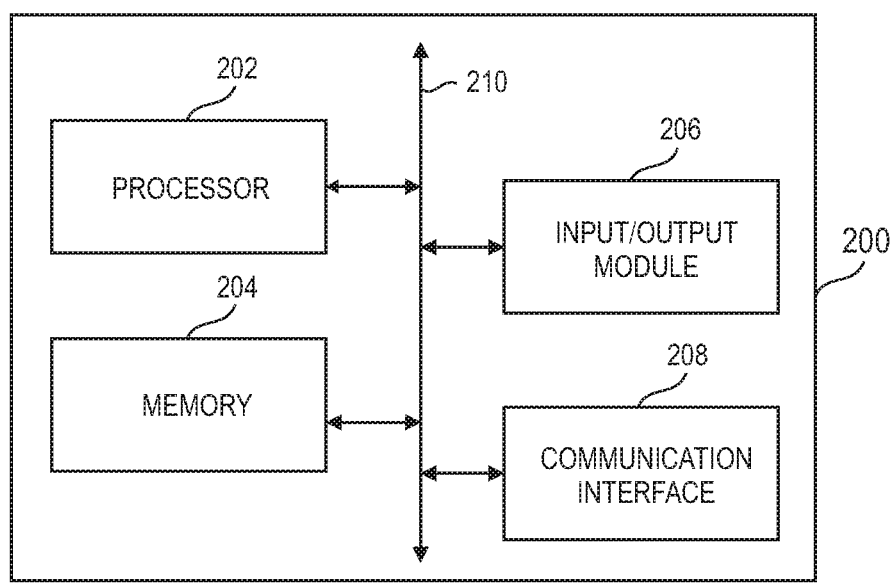
FIG. 2 is a block diagram of an apparatus configured to reserve agents for enabling zero-waiting time agent interactions, in accordance with an embodiment of the invention.

FIG. 2 is a block diagram of an apparatus 200 configured to facilitate reservation of agents for enabling wait-less or zero-waiting time agent interactions, in accordance with an embodiment of the invention. The term 'agent' as used herein refers to a customer sales and support representative of an enterprise. The agent may be a human agent or an automated-robot (for example, a chatbot, an interactive voice response or IVR system, etc.) capable of assisting customers with their respective needs. The term 'reserving agents' or 'reservation of agents' as used throughout the description refers to loosely allocating (or soft assigning) a customer interaction to an agent. The interaction, in such a scenario, may be initiated if the customer accepts an offer for assistance, in which case, the agent is then committed (or hard assigned) to assisting the customer. Furthermore, the terms 'wait-less', 'zero-waiting time' or 'zero-wait' as interchangeably used throughout the description refers to initiation of customer interaction with an agent as soon as the customer accepts the offer for interaction. Such initiation of interaction may be associated with almost zero or negligible delay (on the order of milliseconds, for example, on account of communication link delays, etc.) and, as such, the customer may not have to wait or receive an automated message informing him of initiation of interaction within a short duration of time. Such wait-less or zero-wait agent interactions precludes frustrating delays for the customers waiting for the agents to be available and an agent interaction with a customer can be initiated immediately upon acceptance for the offer of interaction.

Further, the term 'customer' as used herein refers to either an existing user or a potential user of enterprise offerings such as products, services and/or information. Moreover, the term 'customer' of the enterprise may refer to an individual, a group of individuals, an organizational entity, etc. The term 'enterprise' as used herein may refer to a corporation, an institution, a small/medium sized company, or even a brick and mortar entity. For example, the enterprise may be a banking enterprise, an educational institution, a financial trading enterprise, an aviation company, a consumer goods enterprise, or any such public or private sector enterprise. Moreover, the term 'interaction' or 'customer interaction' as used interchangeably herein refers to any communication and/or exchange between a customer and a customer support representative of the enterprise and the like. In an illustrative example, a customer activity of engaging in a voice call interaction or a chat interaction with an agent (a human agent or a virtual agent) associated with the enterprise may be considered as an interaction between the customer and the enterprise.

The apparatus 200 includes at least one processor, such as a processor 202 and a memory 204. It is noted that although the apparatus 200 is depicted to include only one processor, the apparatus 200 may include more number of processors therein. In an embodiment, the memory 204 is capable of storing machine executable instructions. Further, the processor 202 is capable of executing the stored machine executable instructions. In an embodiment, the processor 202 may be embodied as a multi-core processor, a single core processor, or a combination of one or more multi-core processors, and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices, and non-volatile memory devices. For example, the memory 204 may be embodied as magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories, such as mask ROM, PROM (programmable ROM), EPROM (erasable PROM), flash memory, RAM (random access memory), etc.

In an embodiment, the memory 204 is configured to store information related to skills associated with each agent from among a plurality of agents associated with an enterprise. For example, an agent may be skilled in resolving customer queries related to prepaid calling cards, voice and data plans, and billing related concerns. Accordingly, the memory 204 may store such information related to each agent as skills. It is understood that agents are assigned to assist customers based on a match of their skills to the concerns of the customers. Accordingly, each type of customer concern may be associated with multiple customers or a queue of customers, who are attended to by agents with specific skill or one or more specific skills. Accordingly, the memory 204 is configured to keep track of multiple queues being employed to assist customers. Because the queues are matched to agent skills, the terms 'skills' and 'queues' are used interchangeably hereinafter. Moreover, it is noted that reserving an agent may imply reserving a time slot or a ticket corresponding to the agent. When agents are able to handle multiple slots, as they can in a chat interaction, it is the slots that are being reserved.

In an embodiment, the memory 204 is also configured to store information related to a current reservation status of each agent (for example, a live agent or a virtual agent) associated with an enterprise. The current reservation status of an agent is indicative of whether the agent is free, reserved, or currently engaged in a customer interaction. More specifically, each agent may be associated with one of the following states: an interaction state (i.e. the agent is currently engaged in an interaction with a customer), a reserved state (i.e. the agent is reserved for an interaction with a customer and the interaction may be initiated once the customer accepts an offer for an assistance), and a free state (i.e. the agent is currently neither engaged in an interaction nor reserved for an interaction with a customer).

The apparatus 200 also includes an input/output module 206 (hereinafter referred to as 'I/O module 206') and a communication interface 208. The I/O module 206 is configured to facilitate provisioning of an output to a user of the apparatus 200. In an embodiment, the I/O module 206 may be configured to provide a user interface (UI) configured to provide options or any other display to the user. The I/O module 206 may also include mechanisms configured to receive inputs from the user of the apparatus 200. The I/O module 206 is configured to be in communication with the processor 202 and the memory 204. Examples of the I/O module 206 include, but are not limited to, an input interface and/or an output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, a vibrator, and the like. In an example embodiment, the processor 202 may include I/O circuitry configured to control at least some functions of one or more elements of the I/O module 206, such as, for example, a speaker, a microphone, a display, and/or the like. The processor 202 and/or the I/O circuitry may be configured to control one or more functions of the one or more elements of the I/O module 206 through computer program instructions, for example, software and/or firmware, stored on a memory, for example, the memory 204, and/or the like, accessible to the processor 202.

In an embodiment, the communication interface 208 is communicably associated with a plurality of enterprise related interaction channels. Some non-limiting examples of the enterprise related interaction channels may include a Web channel (i.e. an enterprise website), a voice channel (i.e. voice-based customer support), a chat channel (i.e. a chat support), a native mobile application channel, a social media channel, and the like. The communication interface 208 receives up-to-date information related to the customer-enterprise interactions from the enterprise related interaction channels. In some embodiments, the information may also be collated from the plurality of devices used by the customers. To that effect, the communication interface 208 may be in operative communication with various customer touch points, such as electronic devices associated with the customers (such as the desktop computer 108 associated with the customer 102 in FIG. 1), websites visited by the customers, customer support representatives (for example, voice agents, chat agents, IVR systems, in-store agents, and the like) engaged by the customers, and the like.

In an embodiment, the information received for each customer includes profile data and interaction data corresponding to respective customer's interactions with the enterprise. A customer's profile data may include profile information related to the customer, such as for example, a customer's name and contact details, information relating to products and services associated with the customer, social media account information, information related to other messaging or sharing platforms used by the customer, recent transactions, customer interests and preferences, customer's credit history, history of bill payments, credit score, memberships, history of travel, and the like. In some exemplary embodiments, the customer information may also include calendar information associated with the customer. For example, the calendar information may include information related to an availability of the customer during the duration of the day/week/month.

In an embodiment, interaction data received corresponding to a customer may include information such as enterprise website related Web pages visited, queries entered, chat entries, purchases made, exit points from websites visited, decisions made, mobile screens touched, work flow steps completed, sequence of steps taken, engagement time, IVR speech nodes touched, IVR prompts heard, widgets/screens/buttons selected or clicked, historical session experience and results, customer relationship management (CRM) state and state changes, agent wrap-up notes, speech recordings/transcripts, chat transcripts, survey feedback, channels touched/used, sequence of channels touched/used, instructions, information, answers, actions given/performed by either enterprise system or agents for the customer, and the like. In some example scenarios, the interaction data may include information related to past interactions of the customer with resources at a customer support facility, the types of channels used for interactions, customer channel preferences, types of customer issues involved, whether the issues were resolved or not, the frequency of interactions, and the like.

The communication interface 208 is configured to facilitate reception of such information related to the customers in real-time or on a periodic basis. Moreover, the information may be received by the communication interface 208 in an online mode or an offline mode. In an embodiment, the communication interface 208 provides the received information to the memory 204 for storage purposes. In an embodiment, the information related to each customer is labeled with some customer identification information (for example, a customer name, a unique ID and the like) prior to storing the information in the memory 204.

The communication interface 208 may further be configured to receive information related to an on-going interaction in real-time and provide the information to the processor 202. In at least some embodiments, the communication interface 208 may include relevant application programming interfaces (APIs) to communicate with remote data gathering servers associated with the various enterprise related interaction channels. Moreover, the communication between the communication interface 208 and the remote data gathering servers may be realized over various types of wired or wireless networks.

In an embodiment, various components of the apparatus 200, such as the processor 202, the memory 204, the I/O module 206, and the communication interface 208 are configured to communicate with each other via or through a centralized circuit system 210. The centralized circuit system 210 may be various devices configured to, among other things, provide or enable communication between the components (202-208) of the apparatus 200. In certain embodiments, the centralized circuit system 210 may be a central printed circuit board (PCB) such as a motherboard, a main board, a system board, or a logic board. The centralized circuit system 210 may also, or alternatively, include other printed circuit assemblies (PCAs) or communication channel media.

It is understood that the apparatus 200 as illustrated and hereinafter described is merely illustrative of an apparatus that could benefit from embodiments of the invention and, therefore, should not be taken to limit the scope of the invention. It is noted that the apparatus 200 may include fewer or more components than those depicted in FIG. 2. In an embodiment, the apparatus 200 may be implemented as a platform including a mix of existing open systems, proprietary systems, and third party systems. In another embodiment, the apparatus 200 may be implemented completely as a platform including a set of software layers on top of existing hardware systems. In an embodiment, one or more components of the apparatus 200 may be deployed in a Web server. In another embodiment, the apparatus 200 may be a standalone component in a remote machine connected to a communication network and capable of executing a set of instructions (sequential and/or otherwise) to facilitate reservation of agents for enabling wait-less agent interactions. Moreover, the apparatus 200 may be implemented as a centralized system, or, alternatively, the various components of the apparatus 200 may be deployed in a distributed manner while being operatively coupled to each other. In an embodiment, one or more functionalities of the apparatus 200 may also be embodied as a client within devices, such as customers' devices. In another embodiment, the apparatus 200 may be a central system that is shared by or accessible to each of such devices.

The reservation of zero-wait agent interactions by the apparatus 200 is hereinafter explained with reference to one customer. It is noted the apparatus 200 may be caused to reserve zero-wait agent interactions for several customers in a similar manner.

In at least one example embodiment, the processor 202 is configured to, with the content of the memory 204, cause the apparatus 200 to receive information corresponding to customer activity of a customer on at least one enterprise related interaction channel. More specifically, the communication interface 208 may receive the information corresponding to the customer activity on one or more enterprise related interaction channels. In an illustrative example, one or more Web pages of an enterprise website (i.e. the Web interaction channel) may be associated with tags, such as HTML tags or JavaScript tags on the various elements of the website to facilitate capture of information related to customer activity on the website. Alternatively, the Web server hosting the website may be configured to open up a socket connection to facilitate capture of information related to the customer activity on the website. The captured customer activity on the website may include information such as Web pages visited, time spent on each Web page, menu options accessed, drop-down options selected or clicked, mouse movements, hypertext mark-up language (HTML) links those which are clicked and those which are not clicked, focus events (for example, events during which the customer has focused on a link/webpage for a more than a predetermined amount of time), non-focus events (for example, choices the customer did not make from information presented to the customer (for examples, products not selected) or non-viewed content derived from scroll history of the customer), touch events (for example, events involving a touch gesture on a touch-sensitive device such as a tablet), non-touch events, and the like. In at least one example embodiment, the communication interface 208 may be configured to receive such information using relevant application programming interfaces or APIs from the Web server hosting the Web pages associated with the website. The information related to the customer activity may be received by the communication interface 208 over a communication network involving wired, and/or wireless networks.

In another illustrative example, customer activity on an enterprise IVR channel may include information such as menu options selected, type of customer concern, resolution status of the concern, time involved in the IVR interaction, and the like. Such information may be received by the communication interface 208 from a server associated with the IVR system and configured to maintain a log of the customer interaction with the IVR system.

In at least one example embodiment, the processor 202 is configured to, with the content of the memory 204, cause the apparatus 200 to determine if a customer associated with the customer activity requires agent assistance based on the received information. As explained with reference to FIG. 1, the customer may require assistance for a variety of reasons. For example, a customer may be searching for relevant information on an enterprise website for troubleshooting an issue with a product. In another example scenario, the customer may have trouble making a bill payment using a native mobile application associated with the enterprise. In another example scenario, the customer may have contacted an enterprise IVR system to report a fraudulent transaction on his or her card.

In an embodiment, to determine if a customer requires agent assistance, the apparatus 200 may be caused to predict at least one intention of the customer. In an embodiment, the processor 202 is configured to predict a customer's intention based on received information from the communication interface 208 and determine if an agent assistance should be proactively offered to the customer or not. In an embodiment, for customer intention prediction purposes, the memory 204 stores one or more prediction models (not shown in FIG. 2), which are configured to subject the received information corresponding to customer activity and any previously gathered information corresponding to the customer to a set of structured and un-structured data analytical models including text mining & predictive models. Examples of the prediction models may include, but are not limited to Logistic regression, Naïve Bayesian, Rule Engines, Neural Networks, Decision Trees, Support Vector Machines, k-nearest neighbor, K-means and the like. In an embodiment, the prediction models may be configured to extract features from received information and any previously gathered information and provision the features to the prediction models. Examples of the features that may be provisioned to the prediction models may include, but are not limited to, any combinations of words features such as n-grams, unigrams, bigrams and trigrams, word phrases, part-of-speech of words, sentiment of words, sentiment of sentences, position of words, customer keyword searches, customer click data, customer Web journeys, cross-channel journeys, call-flow, the customer interaction history, and the like. In an embodiment, the prediction models may use any combination of the above-mentioned input features to predict the customer's likely intention. In some embodiments, the intention can be inferred and or predicted based on prior or current activity, or it can be specifically indicated by the customer. In some embodiments, machine learning and other artificial intelligence (AI) techniques may be used to monitor the predictions and the customer responses to improve the predictions.

In an illustrative example, if the customer's intention related to a customer's visit to an enterprise website is determined to be a casual browsing, then in such a scenario, the processor 202 may determine not to offer assistance to the customer unless the customer requests assistance by his own volition. In another illustrative example, the processor 202 may predict that the customer intends to purchase a product displayed on the enterprise website. In such a scenario, the processor 202 may determine that assistance, for example in form of chat with a live/virtual agent, may be offered to the customer for improving the chances of making a sale. In another illustrative example, the processor 202 may determine that a customer is better served by speaking to a live agent instead of an IVR system and accordingly determine to offer assistance to the customer.

In some embodiments, the determination of requirement of agent assistance for the customer is performed based on enterprise objectives. Some non-limiting examples of the enterprise objectives may include a sales objective, a service objective, an influence objective, and the like. The sales objective may be indicative of a goal of increasing sales revenue of the enterprise. The service objective may be indicative of a motive of improving interaction experience of the customer, whereas the influence objective may be indicative of the motive of influencing a customer into making a purchase. Accordingly, based on the enterprise objectives, the received information corresponding to the customer activity may be evaluated and the determination of whether the customer requires agent assistance or not may be made. In an illustrative example, the processor 202 may offer a customer engaged in an interaction with an IVR system to switch to a voice conversation with a live agent for enriching the customer's interaction experience.

In at least one embodiment, the apparatus 200 may be caused to provision an offer for interaction assistance if it is determined that the customer requires agent assistance. As explained with reference to FIG. 1, an interaction should be initiated without any waiting time for the customer if the customer accepts the offer for assistance. To provide such assistance to the customer, an availability of an agent has to be ensured prior to offering assistance to the customer or the customer might have to wait for the agent to be available for continuing the interaction. Accordingly, agents may need to be reserved before offering assistance to the customers to ensure their availability when required.

In at least one example embodiment, the processor 202 is configured to, with the content of the memory 204, cause the apparatus 200 to determine if an agent associated with at least one relevant skill for providing assistance to the customer is capable of being reserved or not. Such a determination may be performed if it is determined that the customer requires agent assistance.

In an embodiment, the apparatus 200 is caused to determine if a free agent associated with a relevant skill for assisting the customer is capable of being reserved or not. If a free agent is associated with the relevant skill, then the free agent is reserved for assisting the customer. If no free agent from among the plurality of agents is associated with the relevant skill for assisting the customer, then, in at least one embodiment, the apparatus 200 is caused to determine whether a currently reserved agent is associated with the relevant skill required for providing assistance to the customer. As explained above, a currently reserved agent is an agent reserved to interact with a customer if the customer accepts the offer for interaction. More specifically, the currently reserved agent is soft assigned to interact with a customer and the interaction has not been initiated yet. If a currently reserved agent is determined to be associated with the relevant skill, then the apparatus 200 is caused to determine whether a reservation of the currently reserved agent is capable of being swapped with a free agent. In an embodiment, the reservation of each currently reserved agent may be sequentially checked to determine if the reservation is capable of being swapped with a free agent or not. If it is determined that the reservation of a currently reserved agent can be swapped with a free agent, then the apparatus 200 is caused to swap the reservation associated with the currently reserved agent to the free agent and reserve the currently reserved agent for assisting the customer. More specifically, upon determining that an agent (either a free agent or a currently reserved agent) is capable of being reserved for providing assistance to the customer, in at least one example embodiment, the processor 202 is configured to, with the content of the memory 204, cause the apparatus 200 to reserve the agent for assisting the customer. Further, the apparatus 200 is caused to provision an offer for assistance to the customer on the enterprise related interaction channel upon reservation of the agent.

In an embodiment, the provisioning of the offer for assistance may include displaying a pop-up window or a widget on an enterprise related interaction channel such as a website or a native mobile application. The pop-up window or the widget may display text, such as 'Click here to speak with our agent' or 'Need assistance, click here' to the customer. The customer may provide a click input on the pop-up window or the widget to accept the offer for assistance. In another example scenario, the provisioning of the offer for assistance may include providing a voice message, such as 'Press nine to speak with our agent' during an on-going IVR interaction. The customer may press the number '9' on a dial pad associated with a customer electronic device to accept the offer for agent assistance.

If the customer accepts an offer for assistance, then an interaction between the agent and the customer may be initiated without any delay and the customer may be provisioned with required assistance, such as for example, answers to queries, help in troubleshooting a concern, assistance in making a travel reservation, assistance in reporting a fraudulent transaction, booking a complaint, etc. Such a reservation of the agent enables wait-less customer interaction with the agent upon customer acceptance of the offer.

If the reservation of the currently reserved agent is not capable of being swapped with the free agent, then the apparatus 200 is caused to determine that an agent from among the plurality of agents is not capable of being reserved for providing assistance to the customer. In an embodiment, the offer for interaction is not provisioned to the customer if it is determined that the agent is not capable of being reserved for providing assistance to the customer.

In at least one embodiment, the determination of reservation of the agent as explained above is performed by generating a data structure representation configured to facilitate tracking an availability of an agent skill relevant for assisting a customer. In an embodiment, the data structure representation includes a network of nodes and edges for dynamically mapping reservations of currently reserved agents from among the plurality of agents.

In an embodiment, each node in the data structure representation corresponds to a skill of a currently reserved agent and each edge in the data structure representation is configured to a connect a node corresponding to a skill for which the currently reserved agent is reserved to one or nodes associated with remaining skills of the currently reserved agent. Further, each edge is annotated with respective agent identification. A data structure representation including such a network of nodes and edges is explained in detail with reference to FIGS. 3 to 4C.

Alternatively, in an embodiment, each node in the data structure representation corresponds to a currently reserved agent and each edge in the data structure representation represents a skill of the currently reserved agent.

More specifically, the data structure representation may be generated such that the agents correspond to nodes and the skills of the agents correspond to edges in the representation, or alternatively the skills of the agents correspond to nodes and the agents correspond to edges in the representation. If such a data structure representation is generated, then a complexity of identifying if a reservation can be made or not is reduced to the order of number of nodes+number of edges. For example, 500 agents and 50 skills would only be ten times computationally expensive compared to a scenario involving 50 agents and five skills which, in turn, would only be ten times more expensive to compute as compared to a scenario involving five agents and one skill.

In an embodiment, the data structure representation is generated each time a check is to be performed whether an agent can be reserved or not. Once the data structure representation is generated then the processor 202 may be configured to apply known node network algorithms, such as Breadth-First Search (BFS) and/or Dijkstra's algorithm, to traverse the nodes in the data structure representation and determine if an agent with required skill(s) can be reserved for an interaction with the customer or not. The generation of the data structure representation and determination if an agent with required skill(s) can be reserved for an interaction with the customer or not is further explained with reference to the following figures.

Figure 3:
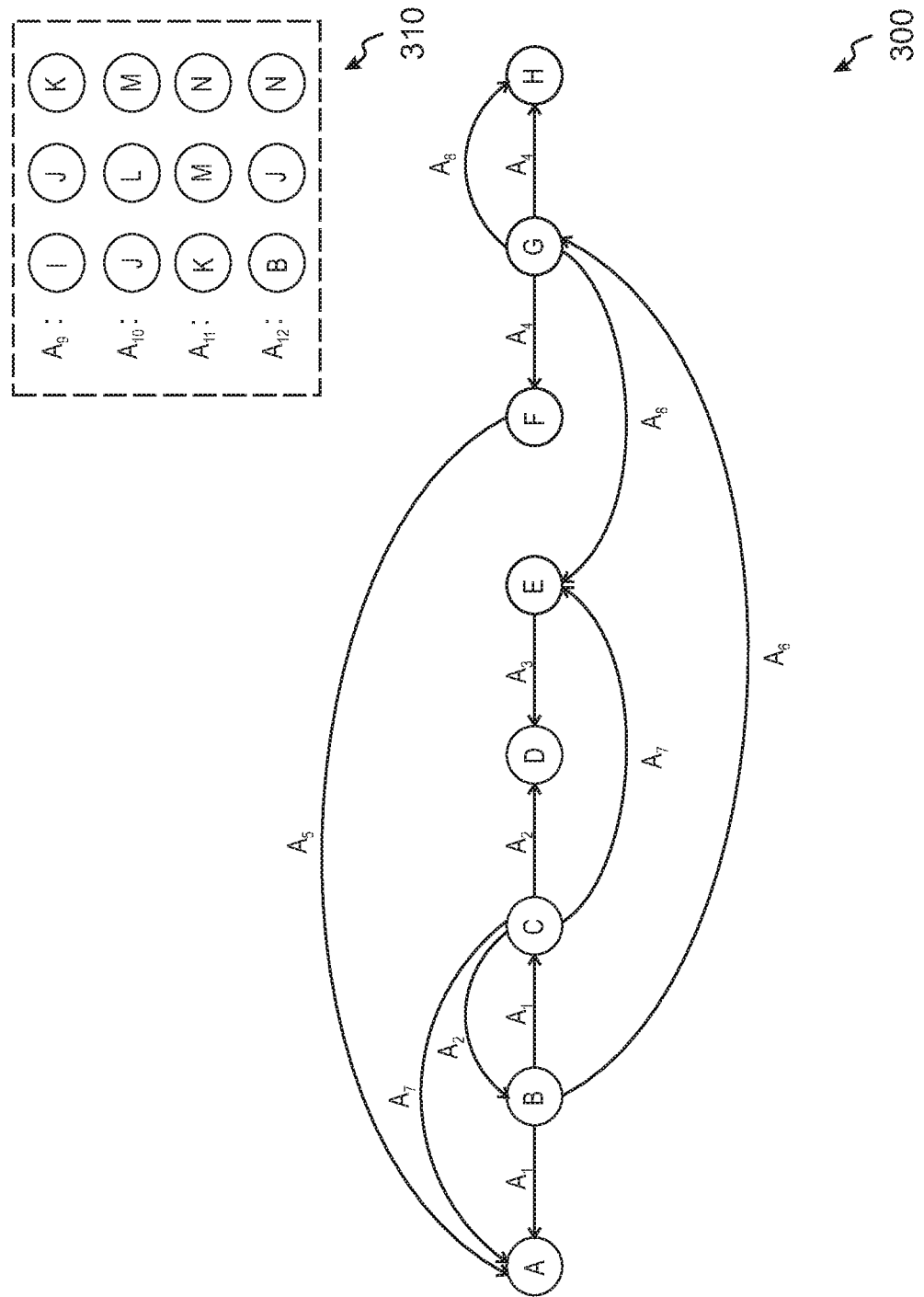
FIG. 3 shows a portion of an example data structure representation generated by the apparatus of FIG. 2, in accordance with an embodiment of the invention.
Figure 4A:
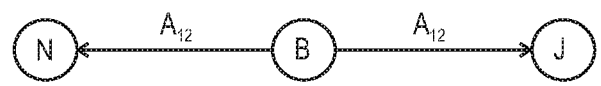
FIGS. 4A, 4B, 4C depict example representations of portions of the data structure representation for illustrating mapping of reservations to appropriately skilled agents, in accordance with an embodiment of the invention.
Figure 4B:
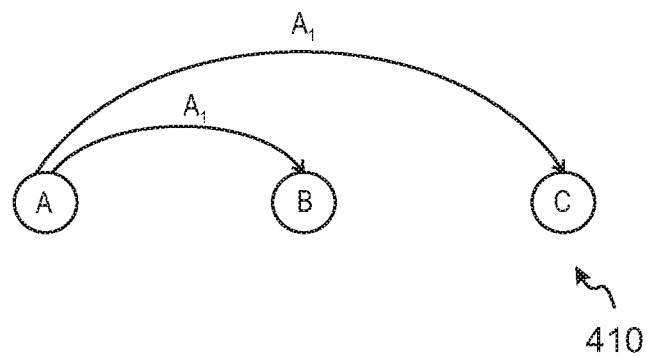

FIG. 3 shows a portion 300 of an example data structure representation generated by the apparatus 200, in accordance with an embodiment of the invention. The portion 300 of the data structure representation is hereinafter referred to as node network 300. As explained with reference to FIG. 2, the processor 202 of the apparatus 200 is configured to generate a data structure representation to facilitate tracking an availability of an agent skill relevant for assisting a customer. The data structure representation is configured to dynamically (for example, in real-time) map reservations of currently reserved agents from among the plurality of agents. A portion of such a data structure representation generated by the processor 202 is depicted in form of the node network 300. Those skilled in the art will appreciate that, while the node network 300 is depicted in FIG. 3 for purposes of comprehension by the reader, the node network is typically a dynamic data structure within a data processing system.

In the node network 300, agent skills are represented as nodes and the agents are represented as edges connecting the nodes. But it is noted in some example representations, the agents may be represented as nodes and the edges connecting the nodes may represent the skills of the agents. Further, as explained with reference to FIG. 2, the processor 202 may initiate generation of the data structure representation when a determination of whether an agent can be reserved for customer interaction or not is to be performed. However, it is noted that in some embodiments, the processor 202 may maintain a data structure representation in the memory 204 and further modify the data structure representation to reflect any state change, as will be explained later.

The node network 300 depicts a scenario involving eight multi-skilled agents: $A_1$, $A_2$, $A_3$, $A_4$, $A_5$, $A_6$, $A_7$, and $A_8$. Agent $A_1$ is associated with skills A, B, and C; Agent $A_2$ is associated with skills B, C, and D; Agent $A_3$ is associated with skills D and E; Agent $A_4$ is associated with skills F, G, and H; Agent $A_5$ is associated with skills A and F; Agent $A_6$ is associated with skills B and G; Agent $A_7$ is associated with skills A, C, and E; and Agent $A_8$ is associated with skills G, H, and E.

Each of these agents is reserved for an interaction, or in other words, soft-assigned to an interaction with a customer. In an example scenario, Agents $A_1$, $A_2$, $A_3$, $A_4$, $A_5$, $A_6$, $A_7$, and $A_8$ are reserved for skills (or queues): B, C, E, G, F, B, C, and G, respectively. Upon receiving a request to check if an agent can be reserved or not, the processor 202 may be configured to generate the node network 300 as follows:

All the skills A, B, C, D, E, F, G, and H are represented as nodes in the node network 300. Further, because Agent $A_1$ is associated with skills A, B, and C and is reserved for skill B, a directed edge is drawn from B to A and from B to C and each directed edge is annotated with Agent $A_1$ as shown in the node network 300. The directed edges are indicative of paths that can be swapped in case of a new reservation, as will be explained later. Further, because Agent $A_2$ is associated with skills B, C, and D and is reserved for skill C, a directed edge is drawn from C to B and from C to D and each directed edge is annotated with Agent $A_2$, as shown in the node network 300. Similarly, because Agent $A_3$ is associated with skills D and E and is reserved for skill E, a directed edge is drawn from E to D and the directed edge is annotated with the Agent $A_3$; because Agent $A_4$ is associated with skills F, G, and H and is reserved for skill G, a directed edge is drawn from G to F and from G to H and the directed edges are annotated with the Agent $A_4$; because Agent $A_5$ is associated with skills A and F and is reserved for skill F, a directed edge is drawn from F to A and the directed edge is annotated with the Agent $A_5$; because Agent $A_6$ is associated with skills B and G and is reserved for skill B, a directed edge is drawn from B to G and the directed edge is annotated with the Agent $A_6$; because Agent $A_7$ is associated with skills A, C, and E and is reserved for skill C, a directed edge is drawn from C to A and from C to E and the directed edges are annotated with the Agent $A_7$; and because Agent $A_8$ is associated with skills G, H, and E and is reserved for skill G, a directed edge is drawn from G to H and from G to E and the directed edges are annotated with the Agent $A_8$.

Further, one or more agents may be in a free state, i.e. not currently engaged in an interaction nor reserved for an interaction. In an embodiment, the apparatus 200 (explained with reference to FIG. 2) may be caused to configure a set comprising one or more set elements representing skills of the one or more free agents. Each set element may correspond to a skill of one free agent from among the one or more free agents. Further, the determination of whether the free agent is associated with a relevant skill for assisting the customer may be performed by checking the one or more set elements in the set.

For example, FIG. 3 depicts an example block 310 displaying four agents: $A_9$, $A_{10}$, $A_{11}$, and $A_{12}$ in free state. Agent $A_9$ is associated with skills I, J, and K; Agent $A_{10}$ is associated with skills J, L, and M; Agent $A_{11}$ is associated with skills K, M, and N; and Agent $A_{12}$ is associated with skills B, J, and N. The union of all the skills of the free agents form a set: {B, I, J, K, L, M, and N} and a request for a reservation for a particular skill may first be checked against the available set elements in the set for reservation purposes. The set configured in such a manner is hereinafter referred to as a sink set and the set elements are referred to hereinafter as 'sink nodes'.

In an embodiment, each sink node is further linked to the agent that caused the node to be a part of the sink set. For example, upon state change of the Agents $A_9$ and $A_{10}$ for example, from a reserved state to a free state or even from an interaction state to a free state, nodes, I, J, K, L, and M may be added to the sink set. If node corresponding to skill 'J' (hereinafter referred to as node J) was added to the sink set for the first time on account of the state change of the Agent $A_{10}$ then the node J may be annotated with the Agent $A_{10}$. In an illustrative scenario, nodes B, I, J, K, L, M, and N may be annotated with agents as depicted in Table: 1 below:

TABLE 1

| Sink Node | Agent |
| --- | --- |
| B | $A_{12}$ |
| I | $A_9$ |
| J | $A_{10}$ |
| K | $A_{11}$ |
| L | $A_{10}$ |
| M | $A_{10}$ |
| N | $A_{12}$ |

In an illustrative scenario, if a new reservation for an agent with skill B is to be performed by the processor 202, then skill B becomes a source set for which mapping is to be performed. The processor 202 is configured to first check the sink set to check if 'B' is a part of the sink set. Because B is a part of the sink set and is annotated with the Agent $A_{12}$ (from Table: 1), the processor 202 may reserve the free agent $A_{12}$ possessing the skill B to ensure zero waiting time for the customer interaction. The change in the state of the Agent $A_{12}$ from the free state to the reserved state is exemplarily depicted in FIG. 4A. More specifically, the skills associated with the Agent $A_{12}$ are depicted as nodes and directed edges are drawn from the skill for which the Agent $A_{12}$ is now reserved, i.e. skill B, to other nodes, i.e. skills J and N.

In another illustrative scenario, if a new reservation for an agent with skill A is to be performed by the processor 202, then skill A becomes a source set for which mapping is to be performed. The processor 202 is configured to first check the sink set to check if 'A' is a part of the sink set. Because A is not a part of the sink set, the apparatus 200 may be caused to determine that no free agent is associated with a relevant skill for assisting the customer.

As explained with reference to FIG. 2, if no free agent from among the plurality of agents is associated with the relevant skill for assisting the customer then, in at least one embodiment, the apparatus 200 is caused to determine whether a currently reserved agent is associated with the relevant skill required for providing assistance to the customer. If a currently reserved agent is determined to be associated with the relevant skill, then the apparatus 200 is caused to determine whether a reservation of the currently reserved agent is capable of being swapped with a free agent. Accordingly, the processor 202 performs a search to identify agents who are reserved for any of the skills in the sink set and who can handle an interaction with skill A. More specifically, the processor 202 may perform a search to identify agents who are reserved for any of the skills from among B, I, J, K, L, M, and N (which are a part of the sink set) and who also possesses skill A. From the node network 300, the processor 202 may identify Agent $A_1$ who is reserved for skill B and also possesses skill A. In such a scenario, the processor 202 may swap the reservations, or more specifically, reserve the Agent $A_{12}$ with skill B and who is currently free to handle the previously soft-assigned reservation (or the reservation that is currently assigned to the Agent A1) and reserve the Agent $A_1$ to handle the new reservation request for skill A. The state change for the Agent $A_1$ from a reserved state for skill B to another reserved state for skill A is depicted as 410 in FIG. 4B. Further, FIG. 4B also depicts the state change of the Agent $A_{12}$ from free state to reserved state for skill B as 420.

Further, as explained with reference to FIG. 2, the apparatus 200 is caused to sequentially check the reservation of each currently reserved agent to determine if the reservation is capable of being swapped with a free agent. In an embodiment, the apparatus 200 is caused to determine whether the reservation of the currently reserved agent is capable of being swapped with the free agent or not by traversing the nodes and the edges in the data structure representation, for example, by using node network algorithms, such as BFS or Dijkstra's algorithm.

In an illustrative scenario, if a new reservation for an agent with skill D is to be performed by the processor 202, then skill D becomes a source set for which mapping is to be performed. The processor 202 is configured to first check the sink set to check if 'D' is a part of the sink set. Because D is not a part of the sink set, the processor 202 may initiate a search to identify agents who are reserved for any of the skills in the sink set and who can handle an interaction with skill D.

More specifically, the processor 202 may perform a search to identify agents who are reserved for any of the skills from among B, I, J, K, L, M, and N in the sink set and who also possesses skill D. From the node network 300, the processor 202 may determine that no such agents are available. The processor 202 may then be configured to identify all agents who are associated with skill D and draw a directed edge from 'D' to the skill for which those agents are currently reserved. For example, the processor 202 may identify the Agents $A_2$ and $A_3$, who are associated with skill D. Further, these agents are currently reserved for skills C and E.

Figure 4C:
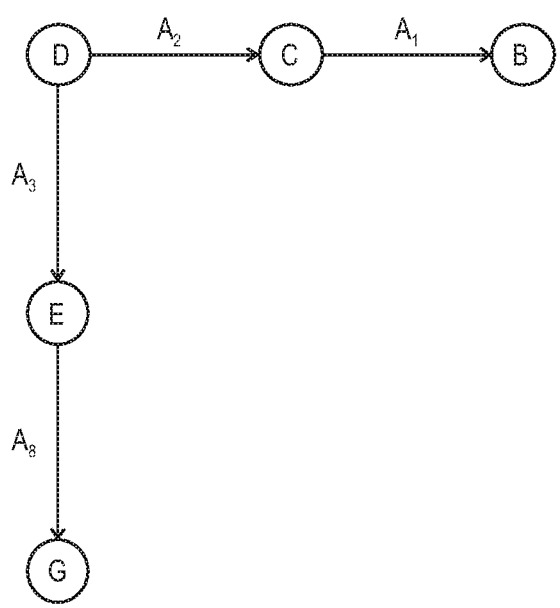

The processor 202 may be configured to draw directed edges from node D to nodes C and E and annotate each edge with the respective agent as depicted in FIG. 4C. For example, the directed edge from node D to node C is annotated with the Agent $A_2$ and the directed edge from node D to node E is annotated with the Agent $A_3$. The nodes, D, C, and E now together form the source set.

The processor 202 may further consider nodes C and E and identify agents who are associated with skills C and E and thereafter draw directed edges from nodes C and E to the node for which these agents are currently reserved. It is noted that the drawing of directed edges is precluded to nodes, which are already a part of the source set. Moreover, no self-directed edges are drawn for any of the nodes in the source set. Accordingly, for node E, the processor 202 may identify that the Agents $A_7$ and $A_8$ are associated with skill E. Note that the agent $A_3$ is not considered because the Agent $A_3$ is already accounted for in the current source set.

The Agent $A_7$ is currently reserved for skill C and the Agent $A_8$ is reserved for skill G. Because skill C is already a part of the source set, a directed edge is only drawn from node E to node G and annotated with the Agent $A_8$, as depicted in FIG. 4C. Similar computation is performed for node C. Accordingly, for node C, the processor 202 may identify that the Agents $A_1$ and $A_7$ are associated with skill C. Note that the Agent $A_2$ is not considered because the agent is already accounted for in the current source set.

The Agent $A_1$ is currently reserved for skill B and the Agent $A_7$ is reserved for skill C. Because skill C is already a part of the source set, a directed edge is only drawn from node C to node B and annotated with the Agent $A_1$, as depicted in FIG. 4C. Now the source set includes nodes: {D, C, E, G, and B}. Thereafter, the processor 202 is configured to check if any skill in the source set is also a part of the sink set, i.e. {B, I, J, K, L, M, and N}. Because skill B from among the source set is also a part of the sink set, reservation for the Agent $A_1$ annotated on the corresponding directed edge may be swapped with the Agent $A_{12}$ who has the skill B. Accordingly, the free agent $A_{12}$ may now be reserved for skill B, whereas the Agent A1 may be freed from reservation for skill B.

The reservation for the Agent $A_2$ annotated on the directed edge from node D to node C may be swapped with the Agent $A_1$ who has the skill C. Accordingly, the Agent $A_1$ may now be reserved for skill C, whereas the Agent $A_2$ may be freed from its existing reservation and can be used for the new reservation for skill D. In this manner, the new reservations may be mapped to agent skills to reserve zero wait reservations.

It is noted that if the sink node was not identified at node G or node B, then the processor 202 would further build the node network and continue to an unvisited node in the source set (for example, using BFS) and repeat attempting to draw directed edges from this new node to any nodes reachable from here (which corresponds to the set of queues that multi-queue agents currently assigned to slot/tickets of this node type) while precluding cycles or edges to agents/ skills already in the source set.

In an embodiment, upon traversing all of the nodes and the edges in the data structure representation, if the reservation of the currently reserved agent is not capable of being swapped with the free agent, then the apparatus 200 is caused to determine that the agent from among the plurality of agents is not capable of being reserved for providing assistance to the customer. In the above illustrative example, if all of the nodes in the source set are visited without connecting to the sink set, then the processor 202 may determine that there is no swap possible and the request for reservation cannot be handled. It is noted that each agent is at the most considered only once and because a directed edge to each node can be added only once (no cycles), the number of edges added is at most the number of queues, thereby rendering the approach to be a linear algorithm in both execution and space.

Further, it is noted that if the agent is not available, then an offer for chat/voice-based assistance or a channel switch may not be made to the customer, but if there is going to be an agent available with zero wait, then that agent may be reserved and the customer and the interaction system (for example, an IVR system) may be prompted if they are both capable of making this transition and want to make this transition. The prompting may involve sending an SMS to a smart phone or, using presence information, an alert may be sent on a Web browser that a customer is already logged in. Once the customer accepts the offer for agent assistance or channel switch, a few minutes after the initial reservation, the reservation would be activated and turned into an interaction/channel switch. If the customer declines the offer, then the reservation may be canceled.

It is noted that though the node network 300 is built to determine if an agent can be reserved or not, however in some embodiments, the processor 202 may maintain a data structure representation in the memory 204 and further modify the data structure representation to reflect any state change. For example, if there is a state change for an agent, say Agent X, from the interaction state to the free state, then the sink set is union of existing sink nodes and skills of Agent X. Moreover, the list of free agents is appended with Agent X. If Agent X is associated with skills $\{S_1, S_2, S_3\}$ and is then assigned a reservation to skill S2 then directed edges are drawn from skill $S_2$ to skill $S_1$ and from skill $S_2$ to skill $S_3$ and the edges are annotated with Agent X as explained with reference to FIGS. 3 to 4C. If the reservation for Agent X is canceled or turned into a chat the edges are unlabeled.

Figure 5:
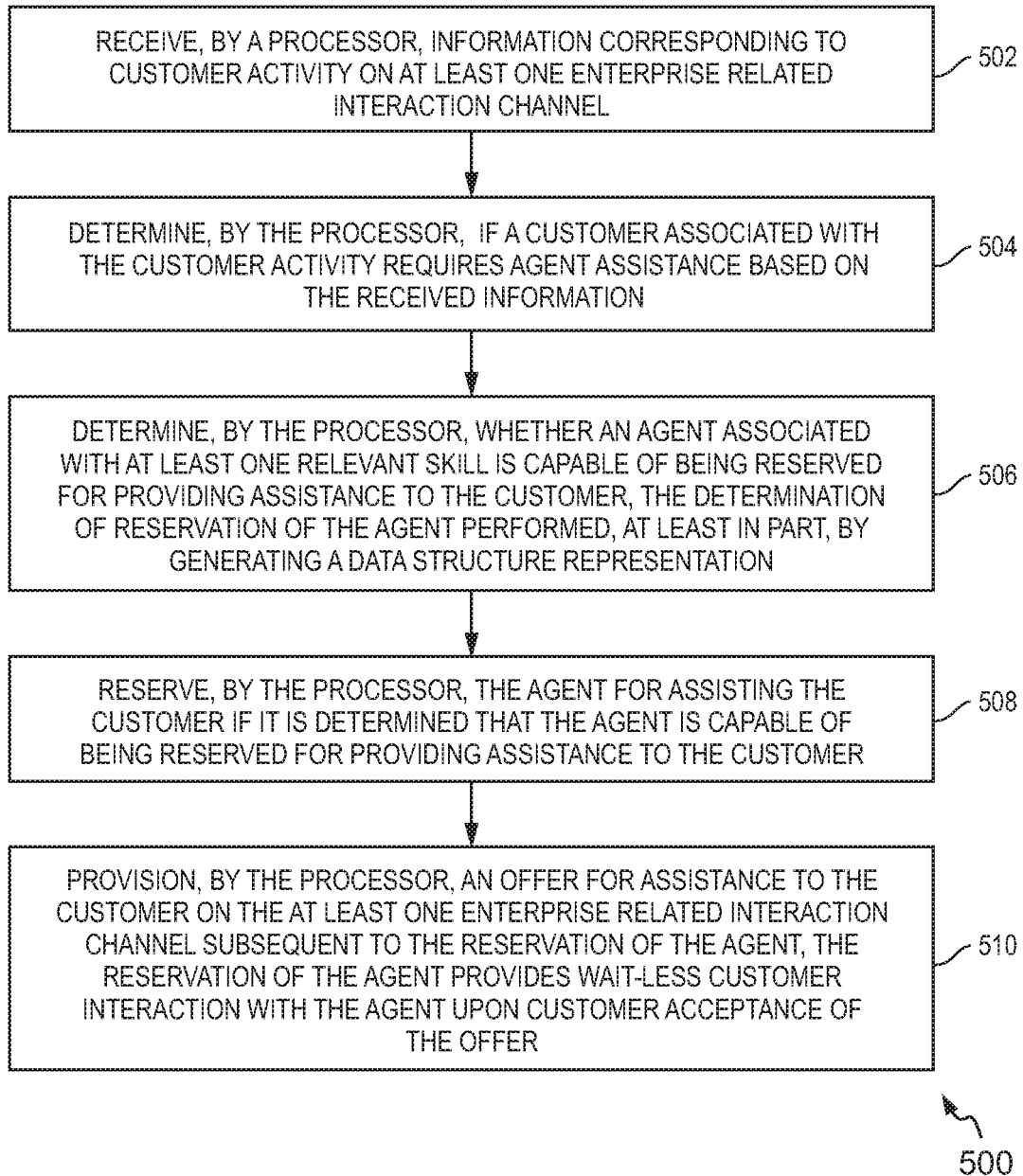
FIG. 5 is a flow diagram of an example method for reserving agents for enabling zero-wait agent interactions, in accordance with an embodiment of the invention.

FIG. 5 is a flow diagram of an example method 500 for reserving agents for enabling zero-wait agent interactions, in accordance with an embodiment of the invention. The method 500 depicted in the flow diagram may be executed by, for example, the apparatus 200 explained with reference to FIGS. 2 to 4C. Operations of the flowchart, and combinations of operation in the flowchart may be implemented by, for example, hardware, firmware, a processor, circuitry, and/or a different device associated with the execution of software that includes one or more computer program instructions. The operations of the method 500 are described herein with help of the apparatus 200. For example, one or more operations corresponding to the method 500 may be executed by a processor, such as the processor 202 of the apparatus 200. It is noted that although the one or more operations are explained herein to be executed by the processor alone, it is understood that the processor is associated with a memory, such as the memory 204 of the apparatus 200, which is configured to store machine executable instructions for facilitating the execution of the one or more operations. It is also noted that, the operations of the method 500 can be described and/or practiced by using an apparatus other than the apparatus 200. The method 500 starts at operation 502.

At operation 502 of the method 500, information corresponding to customer activity on at least one enterprise related interaction channel is received. In an illustrative example, information received corresponding to customer activity on an enterprise website may include information such as Web pages visited, time spent on each Web page, menu options accessed, drop-down options selected or clicked, mouse movements, hypertext mark-up language (HTML) links those which are clicked and those which are not clicked, focus events (for example, events during which the customer has focused on a link/webpage for a more than a predetermined amount of time), non-focus events (for example, choices the customer did not make from information presented to the customer (for examples, products not selected) or non-viewed content derived from scroll history of the customer), touch events (for example, events involving a touch gesture on a touch-sensitive device such as a tablet), non-touch events, and the like. In an embodiment, one or more Web pages of the enterprise website (i.e. the Web interaction channel) may be associated with tags, such as HTML tags or JavaScript tags on the various elements of the website to facilitate capture of information related to customer activity on the website. Alternatively, the Web server hosting the website may be configured to open up a socket connection to facilitate capture of information related to the customer activity on the website. The captured information may be received from the Web server hosting the Web pages associated with the website. The information related to the customer activity may be received over a communication network involving wired and/or wireless networks.

In another illustrative example, customer activity on an enterprise IVR channel may include information such as menu options selected, type of customer concern, resolution status of the concern, time involved in the IVR interaction, and the like. Such information may be received from a server associated with the IVR system and configured to maintain a log of the customer interaction with the IVR system.

At operation 504 of the method 500, it is determined whether a customer associated with the customer activity requires agent assistance or not based on the received information. In an embodiment, a customer's intention may be predicted based on received information corresponding to the customer activity and a determination of whether agent assistance should be proactively offered to the customer or not may be performed. The prediction of customer's intention may be performed using stored prediction models as explained with reference to FIG. 2 and is not explained again herein. In an illustrative example, if the customer's intention related to a customer's visit to an enterprise website is determined to be casual browsing, then it may be determined to not offer assistance to the customer unless the customer requests assistance by his own volition. In another illustrative example, if it is predicted that the customer intends to purchase a product displayed on the enterprise website, then it may be determined that assistance, for example in form of chat with a live/virtual agent may be offered to the customer for improving chances of sale. In some embodiments, the determination of requirement of agent assistance for the customer is performed based on enterprise objectives. Some non-limiting examples of the enterprise objectives may include a sales objective, a service objective, an influence objective, and the like.

If it is determined that the customer requires agent assistance, then at operation 506 of the method 500, it is determined whether an agent from among a plurality of agents is capable of being reserved for providing assistance to the customer. The agent may be associated with at least one relevant skill for providing assistance to the customer. The determination of reservation of the agent is performed, at least in part, by generating a data structure representation configured to facilitate tracking an availability of the at least one relevant skill from among a plurality of skills associated with the plurality of agents.

More specifically, in addition to generating a data structure representation for dynamically mapping reservations of currently reserved agents, a record of free agents and their skills may be maintained as depicted by block 310 in FIG. 3 and explained with reference to table 1 in FIG. 3. The data structure representation in combination with the record of currently free agents and their skills may facilitate tracking of whether a skill required for providing assistance to a customer is available or not. The generation of the data structure representation for determination of whether an agent with relevant skill can be reserved or not is explained with reference to FIGS. 3 to 4C and is not explained herein.

At operation 508 of the method 500, the agent for assisting the customer is reserved if it is determined that the agent is capable of being reserved for providing assistance to the customer. As explained with reference to FIG. 2, reserving an agent implies reserving a time slot or a ticket corresponding to the agent.

At operation 510 of the method 500, an offer for assistance to the customer is provided on the at least one enterprise related interaction channel upon reservation of the agent. The offered assistance may be in form of chat/voice agent assistance and in some cases may include an offer for a channel switch to a customer preferred interaction channel. Such a reservation of the agent provides wait-less customer interaction with the agent upon customer acceptance of the offer.

Figure 6:
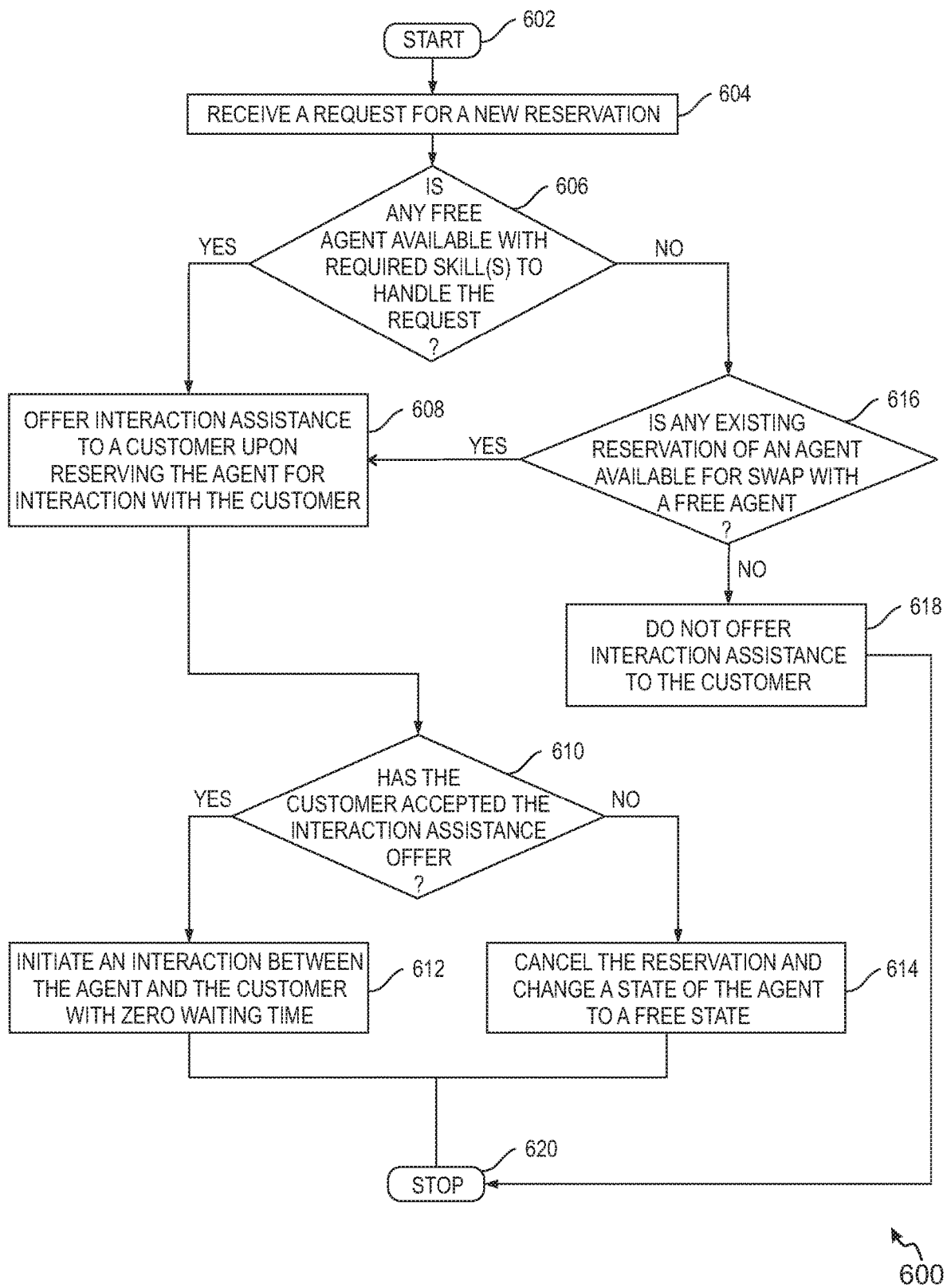
FIG. 6 is a flow diagram of an example method for reserving agents for enabling zero-wait agent interactions, in accordance with another embodiment of the invention.

FIG. 6 is a flow diagram of an example method 600 for reserving agents for enabling zero-wait agent interactions, in accordance with another embodiment of the invention. The method 600 depicted in the flow diagram may be executed by, for example, the apparatus 200 explained with reference to FIGS. 2 to 4C. Operations of the flowchart, and combinations of operation in the flowchart, may be implemented by, for example, hardware, firmware, a processor, circuitry, and/or a different device associated with the execution of software that includes one or more computer program instructions. The method 600 starts at operation 602.

At 604, a request for a new reservation is received. As explained with reference to FIG. 3, the processor 202 may predict a customer's intention and determine whether the customer may be offered interaction assistance/channel switch or not. The request for new reservation may correspond to a request to reserve an agent with a particular skill upon said determination by the processor 202.

At 606, it is determined whether any free agent has the skill(s) to handle the request. If any free agent has the skill(s) to handle the request then the free agent is loosely assigned (or in other words, reserved) for the request and interaction assistance (or channel switch) is offered to the customer upon reserving the agent for the interaction at 608. At 610, it is determined whether the customer has accepted the offer for interaction assistance or not. If the customer has accepted the offer for interaction assistance, then the interaction is initiated with zero waiting time at 614. If the customer has declined the offer for interaction assistance, then the reservation of the agent is canceled and a state of the agent is reset to free state at 616.

If at 604, it is determined that no free agent has the skill(s) to handle the request, then it is determined if any existing group of reserved agents may be swapped along a chain creating a free agent skilled so as to facilitate handling of the request at 616. The determination of swapping of currently reserved agents with that of a free agent may be performed by generating a data structure representation (or using an already maintained data structure representation) and traversing nodes/edges of the node network as explained with reference to FIGS. 3 to 4C. If it is determined that the existing reservation of an agent may be swapped then operations 608, 610 and 612 are performed. If it is determined that the existing reservation of an agent cannot be swapped and all nodes/edges are traversed then it is determined that the offer for interaction assistance should not be offered to the customer at 618. The method 600 ends at 620.

Various embodiments disclosed herein provide numerous advantages. The techniques disclosed herein provide an efficient algorithm to optimally reserve zero-wait interactions with diverse multi-skill/multi-queue agents. More specifically, a method and apparatus are disclosed to provide a zero wait time reservation for a pool of many agents, with agents having diverse sets of skills, and to be able to give the reservation if, and only if, all current chats and reservations could be handled (including a current chat/reservation) and reject the reservation if, and only if, all current chats and reservations could not be handled when adding the reservation. Further, a reservation, once assigned, guarantees success for the window of time the reservation is held. Further, techniques suggested herein support cancelling of reservations or converting them into chats. Furthermore, even though shuffling of agents once chat has started is not allowed, but only a loose coupling of agents to reservations to allow more efficient allocations of reservations is facilitated. The techniques disclosed herein efficiently finds the swaps that would allow a new request to be handled and/or efficiently prove that no such set of swaps could handle the new request and thus rejects the reservation request. Further, the algorithm may also be applied to other applications such as allowing swapping of agents that are chatting to better allocate skills as needed, or reserving agents with probabilistic wait times. Moreover, the data structure representation as suggested herein drastically reduces the complexity of mapping of reservations to appropriately skilled agents and facilitate customer interactions with agents while ensuring zero waiting time for the customers thereby precluding frustrating interaction experiences for the customers and operating losses for the enterprises.

Although the present technology has been described with reference to specific exemplary embodiments, it is noted that various modifications and changes may be made to these embodiments without departing from the broad spirit and scope of the present technology. For example, the various operations, blocks, etc., described herein may be enabled and operated using hardware circuitry (for example, complementary metal oxide semiconductor (CMOS) based logic circuitry), firmware, software, and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the apparatus 200, the processor 202, the memory 204, the I/O module 206, and the communication interface 208 may be enabled using software and/or using transistors, logic gates, and electrical circuits (for example, integrated circuit circuitry such as ASIC circuitry). Various embodiments of the present technology may include one or more computer programs stored or otherwise embodied on a computer-readable medium, wherein the computer programs are configured to cause a processor or computer to perform one or more operations (for example, operations explained herein with reference to FIGS. 5 and 6). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc. Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the present disclosure, as discussed above, may be practiced with steps and/or operations in a different order, and/or with hardware elements in configurations, which are different than those which, are disclosed. Therefore, although the technology has been described based upon these exemplary embodiments, it is noted that certain modifications, variations, and alternative constructions may be apparent and well within the spirit and scope of the technology.

Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A computer-implemented method, comprising:
   receiving, by a processor, information corresponding to customer activity on at least one enterprise related interaction channel;
   determining, by the processor, if a customer associated with the customer activity requires agent assistance based on the received information;
   if it is determined that the customer requires agent assistance, determining, by the processor, whether an agent from among a plurality of agents is capable of being reserved for providing assistance to the customer, wherein the agent is associated with at least one relevant skill for providing assistance to the customer, and wherein the determination of reservation of the agent is performed, at least in part, by:
      assigning the plurality of agents into a first available agent data structure and a second reserved agent data structure, wherein the agent is a member of first available agent data structure or the second reserved agent data structure but not both,
      generating the first available agent data structure representing a plurality of available skills, a plurality of available agents, and for each skill in the plurality of available skills the agent capable of providing the skill, and the second reserved agent data structure representing a plurality of reserved agents, a plurality of skills associated with the plurality of reserved agents and a skill for which each agent in the plurality of reserved agents is reserved,
      reducing a computation time of determining if the agent can be reserved by:
         initially checking using the first available agent data structure including the plurality of available agents to determine whether the at least one relevant skill is contained in the plurality of available skills, without checking the plurality of reserved agents, and
         upon determining that the first available agent data structure contains the at least one relevant skill, removing the agent associated with the at least one relevant skill and skills associated with the agent from the first available agent data structure, and
         representing the agent and the skills associated with the agent in the second reserved agent data structure,
      checking the second reserved agent data structure upon determining that the first available agent data structure does not contain the at least one relevant skill,
      reserving the agent from the second reserved agent data structure upon determining that the agent from the second reserved agent data structure has the at least one relevant skill; and
   provisioning, by the processor, an offer for assistance to the customer on the at least one enterprise related interaction channel subsequent to the reservation of the agent, wherein the reservation of the agent provides wait-less customer interaction with the agent upon customer acceptance of the offer.

2. The method of claim 1, further comprising:
   receiving, by the processor, information related to:
      one or more skills associated with each agent from among the plurality of agents; and
      a current reservation status for the each agent.

3. The method of claim 2, wherein the current reservation status for the each agent is indicative of whether the agent is free, reserved, or currently engaged in a customer interaction.

4. The method of claim 3, wherein the second reserved agent data structure comprises a network of nodes and edges for dynamically mapping reservations of currently reserved agents from among the plurality of agents.

5. The method of claim 4, wherein each node in the second reserved agent data structure corresponds to a skill of a currently reserved agent, wherein each edge in the second reserved agent data structure is configured to a connect a node corresponding to the skill of the currently reserved agent is reserved to one or more nodes associated with remaining skills of the currently reserved agent, and wherein each edge is annotated with respective agent identification.

6. The method of claim 4, wherein each node in the second reserved agent data structure corresponds to a currently reserved agent and each edge in the second reserved agent data structure represents a skill of the currently reserved agent.

7. The method of claim 4, wherein determining whether the agent is capable of being reserved comprises:
determining, by the processor, if a free agent from among the plurality of agents is associated with the at least one relevant skill required for providing assistance to the customer, wherein the free agent is reserved for assisting the customer if the free agent is associated with the at least one relevant skill.

8. The method of claim 7, further comprising:
configuring, by the processor, a set comprising one or more set elements representing skills of one or more free agents from among the plurality of agents, wherein each set element corresponds to a skill of one free agent from among the one or more free agents, and wherein the determination of whether the free agent is associated with the at least one relevant skill is performed by checking the one or more set elements in the set.

9. The method of claim 7, further comprising:
determining, by the processor, whether a currently reserved agent from among the plurality of agents is associated with the at least one relevant skill required for providing assistance to the customer if no free agent from among the plurality of agents is associated with the at least one relevant skill;
determining, by the processor, whether a reservation of the currently reserved agent is capable of being swapped with the free agent from among the plurality of agents if the currently reserved agent is determined to be associated with the at least one relevant skill; and
swapping, by the processor the reservation associated with the currently reserved agent to the free agent and reserving the currently reserved agent for assisting the customer.

10. The method of claim 9, further comprising:
updating, by the processor, the first available agents and second reserved agents data structure to reflect the swapping of the reservation associated with the currently reserved agent to the free agent and the reservation of the currently reserved agent for assisting the customer.

11. The method of claim 9, further comprising:
traversing nodes and the edges in the second reserved agent data structure to determine whether the reservation of the currently reserved agent is capable of being swapped with the free agent.

12. The method of claim 11, further comprising:
upon traversing the nodes and the edges in the second reserved agent data structure, determining, by the processor, that the agent from among the plurality of agents is not capable of being reserved for providing assistance to the customer if the reservation of the currently reserved agent is not capable of being swapped with the free agent.

13. The method of claim 12, wherein the offer for assistance is not provisioned to the customer if it is determined that the agent is not capable of being reserved for providing assistance to the customer.

14. The method of claim 1, further comprising:
predicting, by the processor, at least one intention of the customer based on the received information; and
performing the determination of requirement of agent assistance for the customer based on the predicted at least one intention.

15. The method of claim 1, further comprising:
performing the determination of requirement of agent assistance for the customer based on enterprise objectives.

16. The method of claim 1, wherein the offer for assistance comprises an offer for chat assistance or a voice assistance from the agent, wherein the chat assistance or the voice assistance is conducted on the at least one enterprise related interaction channel from among a plurality of enterprise related interaction channels.

17. An apparatus, comprising:
at least one processor; and
a memory having stored therein machine executable instructions, that when executed by the at least one processor, cause the apparatus to:
receive information corresponding to customer activity on at least one enterprise related interaction channel;
determine if a customer associated with the customer activity requires agent assistance based on the received information;
if it is determined that the customer requires agent assistance, determine whether an agent from among a plurality of agents is capable of being reserved for providing assistance to the customer, wherein the agent is associated with at least one relevant skill for providing assistance to the customer, and wherein the determination of reservation of the agent is performed, at least in part, by:
assigning the plurality of agents into a first available agent data structure and a second reserved agent data structure, the first available agent data structure representing a plurality of available skills, a plurality of available agents, and for each skill in the plurality of available skills the agent capable of providing the skill, and the second reserved agent data structure representing a plurality of reserved agents, a plurality of skills associated with the plurality of reserved agents and a skill for which each agent in the plurality of reserved agents is reserved,
wherein the agent is a member of first available agent data structure or the second reserved agent data structure but not both,
reducing a computation time of determining if the agent can be reserved by:
initially checking the first available agent data structure including the plurality of available agents to determine whether the at least one relevant skill is contained in the plurality of available skills, without checking the plurality of reserved agents, and
upon determining that the first available agent data structure contains the at least one relevant skill, removing the agent associated with the at least one relevant skill and skills associated with the agent from the first available agent data structure, and
representing the agent and the skills associated with the agent in the second reserved agent data structure, checking the second reserved agent data structure upon determining that the first available agent data structure does not contain the at least one relevant skill, and reserving the agent from the second reserved agent data structure upon determining that the agent from the second reserved agent data structure has the at least one relevant skill; and provision an offer for assistance to the customer on the at least one enterprise related interaction channel subsequent to the reservation of the agent.

18. The apparatus of claim 17, wherein the apparatus is further caused to:
receive information related to:
one or more skills associated with each agent from among the plurality of agents; and
a current reservation status for the each agent.

19. The apparatus of claim 18, wherein the current reservation status for the each agent is indicative of whether the agent is free, reserved, or currently engaged in a customer interaction.

20. The apparatus of claim 19, wherein the second reserved agent data structure comprises a network of nodes and edges for dynamically mapping reservations of currently reserved agents from among the plurality of agents.

21. The apparatus of claim 20, wherein each node in the second reserved agent data structure corresponds to a skill of a currently reserved agent, wherein each edge in the second reserved agent data structure is configured to a connect a node corresponding to the skill of the currently reserved agent is reserved to one or nodes associated with remaining skills of the currently reserved agent, and wherein each edge is annotated with a respective agent identification.

22. The apparatus of claim 20, wherein each node in the second reserved agent data structure corresponds to a currently reserved agent and each edge in the second reserved agent data structure represents a skill of the currently reserved agent.

23. The apparatus of claim 20, wherein for determining whether the agent is capable of being reserved, the apparatus is further caused to:
determine if a free agent from among the plurality of agents is associated with the at least one relevant skill required for providing assistance to the customer, wherein the free agent is reserved for assisting the customer if the free agent is associated with the at least one relevant skill.

24. The apparatus of claim 23, wherein the apparatus is further caused to:
configure a set comprising one or more set elements representing skills of one or more free agents from among the plurality of agents, wherein each set element corresponds to a skill of one free agent from among the one or more free agents, and wherein the determination of whether the free agent is associated with the at least one relevant skill is performed by checking the one or more set elements in the set.

25. The apparatus of claim 23, wherein the apparatus is further caused to:
determine whether a currently reserved agent from among the plurality of agents is associated with the at least one relevant skill required for providing assistance to the customer if no free agent from among the plurality of agents is associated with the at least one relevant skill;
determine whether a reservation of the currently reserved agent is capable of being swapped with the free agent from among the plurality of agents if the currently reserved agent is determined to be associated with the at least one relevant skill; and
swap the reservation associated with the currently reserved agent to the free agent and reserve the currently reserved agent for assisting the customer.

26. The apparatus of claim 25, wherein the apparatus is further caused to:
update the first available agents and second reserved agent data structure to reflect the swapping of the reservation associated with the currently reserved agent to the free agent and the reservation of the currently reserved agent for assisting the customer.

27. The apparatus of claim 25, wherein determination of whether the reservation of the currently reserved agent is capable of being swapped with the free agent is performed by traversing nodes and the edges in the second reserved agent data structure.

28. The apparatus of claim 27, wherein the apparatus is further caused to:
determine that the agent from among the plurality of agents is not capable of being reserved for providing assistance to the customer when the reservation of the currently reserved agent is not capable of being swapped with the free agent upon traversing the nodes and the edges in the second reserved agent data structure.

29. The apparatus of claim 28, wherein the offer for assistance is not provisioned to the customer if it is determined that the agent is not capable of being reserved for providing assistance to the customer.

30. The apparatus of claim 17, wherein the apparatus is further caused to:
predict at least one intention of the customer based on the received information, wherein the determination of requirement of agent assistance for the customer is performed based on the predicted at least one intention.

31. The apparatus of claim 17, wherein the determination of requirement of agent assistance for the customer is performed based on enterprise objectives.

32. The apparatus of claim 17, wherein the offer for assistance comprises an offer for chat assistance or a voice assistance from the agent, wherein the chat assistance or the voice assistance is conducted on the at least one enterprise related interaction channel from among a plurality of enterprise related interaction channels.

* * * * *